United States Patent [19]

Sandbank et al.

[11] Patent Number: 4,942,466
[45] Date of Patent: Jul. 17, 1990

[54] BANDWIDTH COMPRESSION FOR TELEVISION SIGNALS

[75] Inventors: Charles P. Sandbank, Reigate; Ian Childs, Sutton; Richard Storey, Lingfield, all of United Kingdom

[73] Assignee: British Broadcasting Corporation, London, England

[21] Appl. No.: 90,584

[22] PCT Filed: Dec. 23, 1986

[86] PCT No.: PCT/GB86/00799

§ 371 Date: Oct. 5, 1987

§ 102(e) Date: Oct. 5, 1987

[87] PCT Pub. No.: WO87/04034

PCT Pub. Date: Jul. 2, 1987

[30] Foreign Application Priority Data

Dec. 24, 1985 [GB] United Kingdom ............... 8531776
Dec. 24, 1985 [GB] United Kingdom ............... 8531777
Jul. 16, 1986 [GB] United Kingdom ............... 8617320
Sep. 11, 1986 [GB] United Kingdom ............... 8621893

[51] Int. Cl.[5] .............................................. H04N 7/12
[52] U.S. Cl. .................................... 358/133; 358/138
[58] Field of Search ............... 358/133, 135, 142, 138

[56] References Cited

U.S. PATENT DOCUMENTS

| | | | |
|---|---|---|---|
| 4,542,411 | 9/1985 | Imanaka et al. | 358/133 X |
| 4,665,436 | 5/1987 | Osborne et al. | 358/133 X |
| 4,691,329 | 9/1987 | Juri et al. | 358/133 X |
| 4,706,265 | 11/1987 | Furukawa | 358/133 X |
| 4,713,688 | 12/1987 | Güttner | 358/141 |
| 4,745,458 | 5/1988 | Hirano et al. | 358/12 X |

FOREIGN PATENT DOCUMENTS

| | | |
|---|---|---|
| 0131663 | 1/1985 | European Pat. Off. . |
| 0146713 | 7/1985 | European Pat. Off. . |
| 0095478 | 7/1980 | Japan .................... 358/133 |
| WO84/02442 | 6/1984 | PCT Int'l Appl. . |
| 2139448A | 3/1984 | United Kingdom . |
| 2145610A | 3/1985 | United Kingdom . |
| 2166021 | 4/1986 | United Kingdom . |

OTHER PUBLICATIONS

NHK Laboratories Note, No. 304, Sep. 1984.
HDTV Transmission Method, Fujio et al., (no date).
Improved Display Techniques Based on Sequentially-Scanned Studio and Transmission Standards, C. K. P. Clarke.
HDTV Motion Adaptive Bandwidth Reduction Using DATV, R. Storey.
Video-Rate Image Correlation Processor, Pearson et al., (1977).
BBC Research Department Report–BBC RD 1986/5, R. Storey.
BBC Research Department Report–BBC RD 1983/8, A. Roberts.

Primary Examiner—John W. Shepperd
Assistant Examiner—Victor R. Kostak
Attorney, Agent, or Firm—Robert F. O'Connell

[57] ABSTRACT

A video signal received from a source (10) is bandwidth-compressed by filters (12, 14, 16), filter (14) being a temporal filter and filter (16) being a spatial filter. Selection of the filter to be used is dependent upon picture content. The transmitter reconstitutes in interpolators (44, 46) the signal which would be regenerated at the receiver, determines which filter gives the best results, and transmits an indication of which filter has been used in a digital signal associated with the analogue video signal. Preferably a determination of motion vectors associated with the signal is made and the digital signal indicates which of the determined motion vectors is applicable to different areas of the picture. By transmitting the control signal digitally with the analogue video signal the receiver circuitry is greatly simplified while its reliability is improved.

17 Claims, 4 Drawing Sheets (a)

(b)

BANDWIDTH COMPRESSION FOR TELEVISION SIGNALS

BACKGROUND OF THE INVENTION

This invention is concerned with bandwidth compression for television video signals.

If High Definition Television (HDTV) is to become a practical proposition, then some method of transmitting it to the home is required. It is widely assumed that such transmissions will be via satellite, since spare radio spectrum is not available elsewhere. The principal problem in this case is the extremely wide bandwith of the original HDTV signal—possibly in the region of 40 to 50 MHz for the combined luminance and chrominance information. Such bandwidths can not be accommodated in the 12GHz DBS (digital broadcast by Satellite) band.

The high transmission bandwidth required for HDTV will cause problems not only for terrestrial and satellite broadcasting but also for signal dissemination by other media such as videotape, videodisc and cable. Some form of bandwidth reduction is required in order to overcome these difficulties.

Methods of bandwidth reduction have been described which use sub-Nyquist sampling with ore-filtering in one, two and three dimensions. More recently motion adaptive pre-filtering techniques have been described, are for example NHK Laboratory Note No. 304, 1984, NINOMIYA et al "A single Channel HDTV Broadcast System" and a paper presented by FUJIO, SUGIMOTO and NINOMIYA at the 14th International Television Symposium, Montreux, June 1985, "HDTV Transmission Method (MUSE)". This system is based upon the removal, by filtering, of image frequency components that are assumed to be of little use to the eye. The filtered signal has a much reduced bandwidth and can be re-sampled at a lower rate for transmission.

The use of motion-adaptive spatial sub-sampling can yield impressive reductions in transmitted bandwidth. Still areas of the picture are transmitted at full resolution but with the information being distributed over many different television fields. Moving areas are transmitted at a reduced resolution, taking advantage of the eye's alleged inability to perceive detail in moving objects. This is the approach used in the NHK's MUSE system (described in the above papers) and which has an objective bandwidth compression factor of 4:1, leading to a final transmission bandwidth of only 8.1 MHz. This system has given results that, while in general encouraging, nevertheless can be variable and unpredictable. We have appreciated that the system performance will differ from receiver to receiver and also vary as reception conditions, and hence the carrier to noise ratio, changes, and that this arises because the system detects which areas of the scene are moving and which stationary at every receiver. Furthermore, the system is relatively expensive in requiring movement detection circuitry at every receiver.

SUMMARY OF THE INVENTION

The invention is defined in the claims below to which reference should now be made.

In a preferred embodiment of the invention, described in more detail below, an analogue video signal to be bandwidth reduced is subjected to two types of filtering in parallel, namely temporal filtering which is appropriate where stationary portions of the picture are concerned, and spatial filtering which is appropriate where moving portions of the picture are involved. Which filter output is used at any instant is dependent upon the picture content, and the filtering control signal is not only used at the transmitter/encoder but is also transmitted as a digital signal associated with the analogue video transmission signal to the receiver/decoder.

The preferred system enables a highly detailed image to be transmitted in stationary and slowly moving areas of the picture. The remaining areas contain poorly correlated information such as revealed detail, shot changes and erratic motion. These areas are transmitted at a lower definition since the human visual system genuinely requires less detail when image detail is poorly correlated from field to field.

The reduced bandwidth signal consists mainly of analogue sub-sampled picture data, but also contains a digital conrol signal which we have found to be crucial to the success of this type of system. The digital signal carries reliable information about the motion content of the transmitted image and details of which coding method was used for each moving area.

The encoder and decoder are enabled to operate in precise unison with one another, so that the correct post-filter in the receiver/decoder is chosen area by area to restore the bandwidth reduced signal to a displayable form. This avoids the need to try to estimate movement from the video signal received at the receiver, which is difficult to do reliably as the received signal contains only a quarter of the information available at the encoder and also includes a variable noise level. Also, the transmitted signal has, of course, been sub-sampled in an unknown manner. By transmitting the digital signal associated with the analogue video signal, all decisions on the motion content of the scene are made at the encoder. The receiver is simply told how to decode the signal. In this manner the receiver is simplified and at the same time the overall system performance is improved by guaranteed tracking between encoder and decoder. In addition, display improvement techniques such as line and field rate up-conversion are simplified since reliable motion information, previously lacking, is readily available from the data channel.

BRIEF DESCRIPTION OF THE DRAWINGS

The invention will be described by way of example with reference to the drawings, in which.

DETAILED DESCRIPTION OF THE PREFERRED EMBODIMENTS

Figure 1:
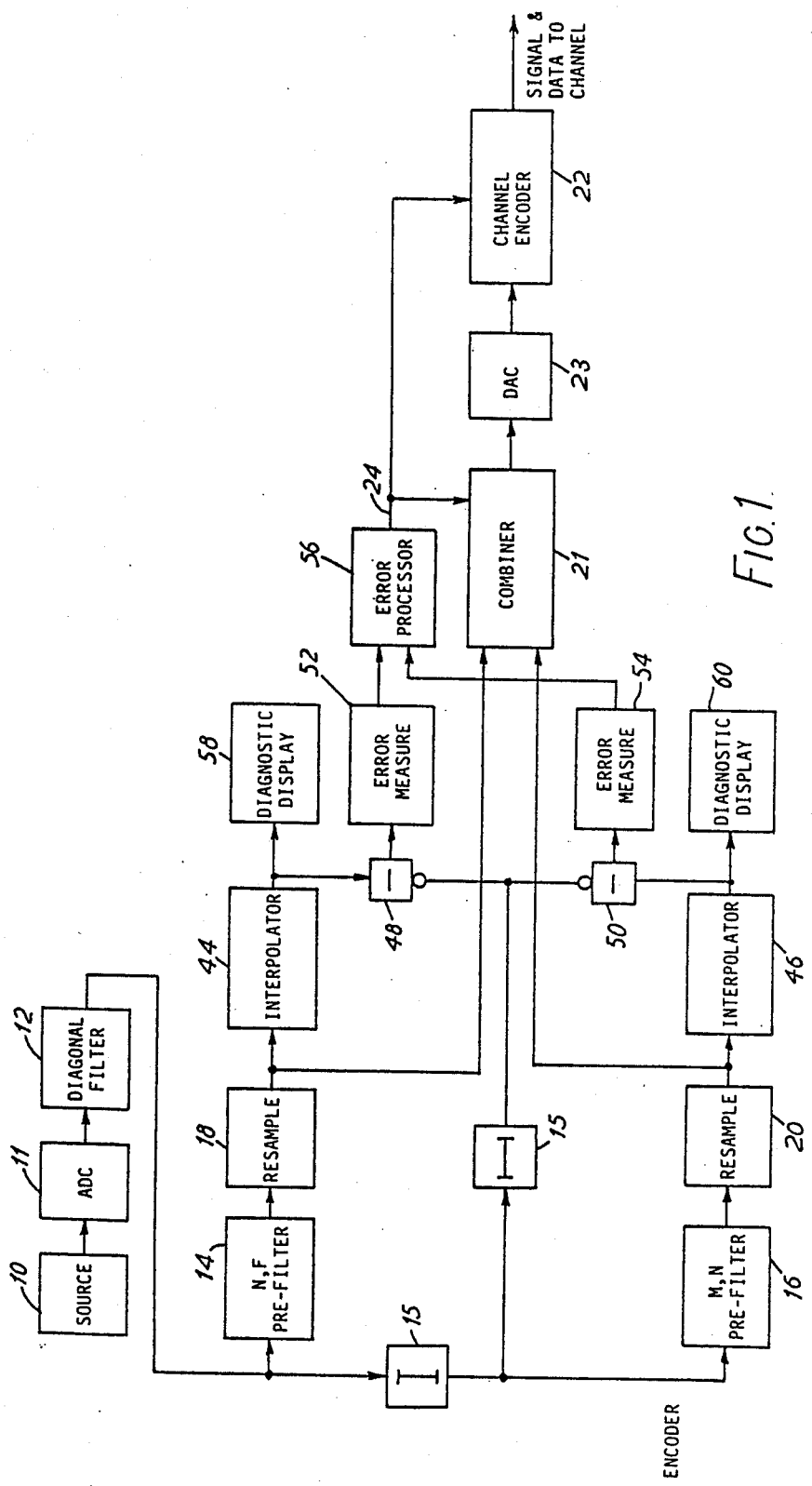
FIG. 1 is a block circuit diagram of a transmitter/encoder embodying the invention.
Figure 2:
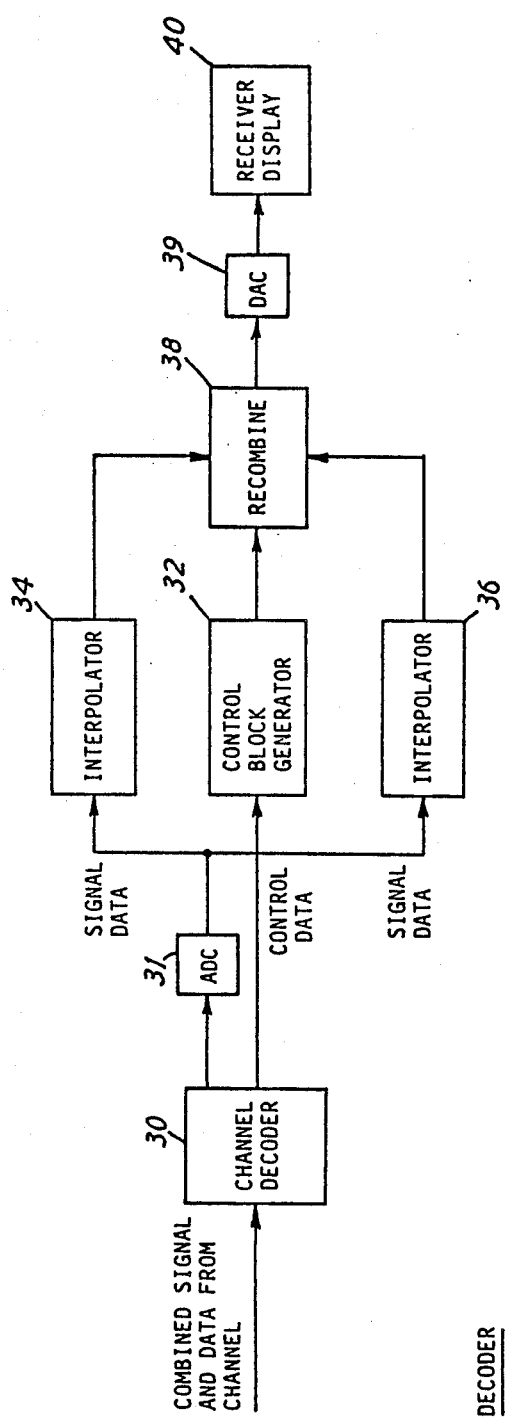
FIG. 2 is a block circuit diagram of a receiver/decoder embodying the invention for use with the transmitter/encoder of FIG. 1.

The television system illustrated comprises an encoder shown in FIG. 1 at the transmitter and decoders as shown in FIG. 2 at each receiver.

The signal from an HDTV source 10 is first converted in an ADC 11 to digital form for ease of processing and applied first to a diagonal spatial filter 12 to reduce diagonal components in the spatial content of the signal. This provides a first 2:1 bandwidth reduction. After this diagonal filtering the signal is filter 14 is a vertical-temporal filter the purpose of which is to reduce the signal bandwidth for stationary and slowly-moving areas, and the second ore-filter 16 is a vertical-horizontal filter or spatial filter to reduce the signal bandwidth for more rapidly moving areas. The two filters 14,16 may, in fact, contain certain elements in common so that some of the circuitry can be shared. Appropriate compensating delays 15 are included.

The filters can be based on the filters described in BBC Research Department Report No. 1975/36 "The filtering of luminance and chrominance signals to avoid cross-colour in a PAL colour system", Dr. J. O. Drewery, published 1975.

The reduced bandwidth signals are re-sampled at a lower rate in re-samplers 18,20 to form two alternative transmission signals. The resampling uses a coarser sampling lattice which is sufficient to support the reduced bandwidth after filtering.

The outputs of the two resamplers 18,20 then form the video component of the transmitted signal and are applied to a combiner 21 and a channel encoder circuit 22. For the moment the circuit 21 can be considered as a selector switch which selects at any moment the output of either resampler 18 or resampler 20 in dependence upon a control input 24 which indicates whether that portion of the signal represents stationary or moving information respectively. The resulting video is converted to analogue form in DAC 23 for transmission and is augmented by a digital signal which indicate the value of the control signal 24 in channel encoder 22.

At the receiver the received broadcast signal, after the usual RF and IF stages, is applied on an input 28 to a channel decoder 30. The channel decoder 30 separates analogue and digital components of the received input signal. The digital component is applied to a control block generator 32 which reforms the digital control signal 24. The analogue component is converted to digital form by ADC 31 before being applied to interpolators 34 and 36 which reconstitute a displayable signal from the received signal as neither of the two sub-sampled signals is suitable for direct display at the receiver. Interpolator 34 is a temporal interpolator for use in stationary image areas and interpolator 36 is a spatial interpolator for use in moving areas. The interpolators restore the resampled signal to the input sampling structure from the source 10.

A recombining circuit 38 is controlled by the control block generator 32, and may be assumed for the moment to select either the output of interpolator 34 or the output of the interpolator 36 to apply through DAC 39 to the receiver display 40. The recombining circuit 38 operates in precise synchronism with the combiner 22 at the encoder, as it responds to the same control input 24 due to the digital information transmitted as part of the signal.

The derivation of the control signal 24 will now be described. This is achieved in principle by restoring the resampled signals to a displayable form in the encoder, using interpolators 44,46 identical to the interpolators 34,36 in the decoder. Thus the encoder has access to the signals that the decoder would generate if it were to use the correct type of interpolator. A subtractor 48 then subtracts the input signal from the output of the interpolator 44 and a subtractor 50 subtracts the input signal from the output of the interpolator 46. From the outputs of the subtractors 48,50, two respective error measurement circuits 52,54 determine a measure of the "error" between the output of the associated interpolator and the input signal on s mean square or mean modulus basis. Thus the circuits 52,54 are able to compare as far as possible the signals which are appearing at the outputs of the interpolators 34,36 at the decoder with the original source signal they are supposed to represent (assuming of course a perfect transmission channel. An error processor or comparator 56 determines which of these errors is the more acceptable corresponding to greater fidelity in the resampled signal and generates the control signal 24 in dependence upon that determination.

The encoder can be provided with two monitor displays 58,60 to enable viewing of the two interpolated signals but these serve no part in the circuit operation.

In this approach to HDTV transmission, all coding decisions are taken at the encoder where the original undistorted signal is available for comparison. The transmission link is configured as an analogue image signal augmented by a rugged digital control signal; we have called this method Digitally Assisted Television (DATV). The decoder is simply told how to reconstruct a displayable signal rather than having to take decisions itself, based on a transmitted signal with a much reduced information content and a much poorer signal-to-noise ratio. In this manner, the system performance is enhanced at the same time as the cost and complexity of the receiver are reduced.

Thus the system illustrated in FIGS. 1 and 2 is seen to be a hybrid analogue/digital coding method. The moving areas of the picture are detected at the bandwidth-compression encoder of FIG. 1. The sub-sampled video is sent in analogue form and the signal from the encoder indicating whether movement is assumed to be present is sent, on an area-by-area basis, in an associated digital signal. The combination of the analogue and associated digital parts of the overall transmission standard forming the two parts of the hybrid. The digital movement signal, which can have a substantial capacity, is used to regenerate the original HDTV standard at the receiver. The receivers are simplified, since they no longer need any motion detectors, and their performance is made more predictable. At the same time the technique allows a better final result to be achieved since, not only will the movement detector operate more satisfactorily when provided with the increased amount of information available before subsampling, but the fact that it is sited at the coder allows more sophisticated and expensive, but higher performance, algorithms to be used. As shown, two regenerated versions of the scene, one via the stationary mode and one via the moving mode, are compared, area by area, with the uncompressed original at the coder. If the stationary mode has the smaller mean squared error then that particular area Is deemed to be statIonary and vIce versa.

The prefilter 14 operates in stationary areas effectively to spread the transmission over four fields for example with a quincunx pattern on each field. A complete, highly detailed stationary image will therefore take the same number of field periods to accumulate. In moving areas priority must be given to smooth portrayal of motion. Thus bandwidth reduction must be achieved by pre-filter 16 by a further reduction in spatial resolution.

The prefilters, subsamplers and interpolators are not described in further detail as they can, for example, be similar to those used in the NHK MUSE system described in the previously-mentioned papers.

The coding decision is taken on a block-by-block basis with each block comprising a certain number of pixels. The block size should be comparable to the aperture of the pre-filters and interpolators to minimise the appearance of artefacts at transitions from one transmission mode to another, but not so large as to produce boundaries identifiable from a normal viewing distance. A vertical and horizontal dimension of about 1/100th of a picture height proves to be a good compromise and yields manageable data rates, in the region of 1 to 2 Mbits/sec, for the control channel.

The block is preferably diamond-shaped as this tends to make the diagonal junctions between blocks less visible. Thus a diamond-shaped block of 8 by 8 pixels containing 32 pixels in all, is preferred, giving about 55,000 blocks per picture. In any event, it is preferred to have at least 1000 blocks per picture but for the blocks to contain in excess of 10 pixels and preferably over 25 pixels each.

The combiners 22,38 can operate as cross-filters rather than simple selector switches to avoid sudden transitions which might be noticeable.

The source and display can operate to any of a range of desired higher definition standards, which need not be the same. The source standard will depend upon the standard used in the HDTV studio. If it is assumed that the source standard is 1125/60/2:1; i.e. 1125 lines per picture, 60 fields per second, with 2 interlaced fields to each picture, then there will be 1035 active lines, a horizontal bandwith of 30MHz (luminance) and an active line duration of 26$\mu$sec. Sampling theory indicates that this may be sampled at a rate of 1560 samples per active line, or 60MHz, without distortion. In practice some additional margin will be required; if this is about 10% then the number of samples per active lines rises to approximately 1700. If alternate-line transmission is assumed for the two colour difference channels, and if each colour difference signal has half the horizontal resolution of the luminance signal, then the combined luminance and chrominance information becomes 2550 samples per active line. If line and field blanking are omitted, the total video sampling rate is $1035 \times 30 \times 2550$ or $79.2 \times 10^6$ samples per second. If this were to be coded as an analogue signal without any sub-sampling bandwidth compression, a bandwidth of nearly 40 MHz would be required.

The required 4:1 bandwidth reduction can be achieved in two stages. The first factor of 2:1 is realised by the diagonal filtering in filter 12. The second factor of 2:1 is achieved by temporal filtering in stationary areas of the picture and by more severe diagonal filtering operating on the moving parts of the picture. After this filtering process, the signal is sub-sampled and can then be transmitted, in analogue form, with a bandwidth of only 10MHz. This corresponds to approximately 80% of the capacity of a 27 MHz wide WARC channel, assuming that bandwidths of up to 12 MHz may be sustained without causing excessive levels of interference.

If dual-channel digital sound is used, with a capacity of 1 Mbit/sec, and making an allowance for synchronisation codes, clamp intervals etc. some 2 Mbits/sec should be available for the auxiliary movement data. This would allow diamond-shaped blocks of say 4 field lines by 8 pixels in the incoming HDTV signal to be coded with a one-bit signal to indicate whether the information in that block is moving or stationary (a bit rate of $1035 \times 1700 \times 30/32$ or 1.65Mbit/sec) and still leave some spare capacity.

If 1920 samples per active line were used for the studio standard it would be possible to convert to 1700 samples using multi-tap interpolation, but alternatively the bandwidth compression could be based on 1920 samples per active line and the number of chrominance samples reduced to one third of the luminance rate i.e. 640 samples per active line. The overall video bandwidth is then little affected. The choice of a higher luminance sampling frequency before transmission would help to reduce the loss of visible information in the diagonal filtering stages.

The standard used at the source and display is not restricted by the present invention but can be any suitable higher definition standard. In particular the standards can be interlaced or sequential (non-interlaced) standards.

Figure 3:
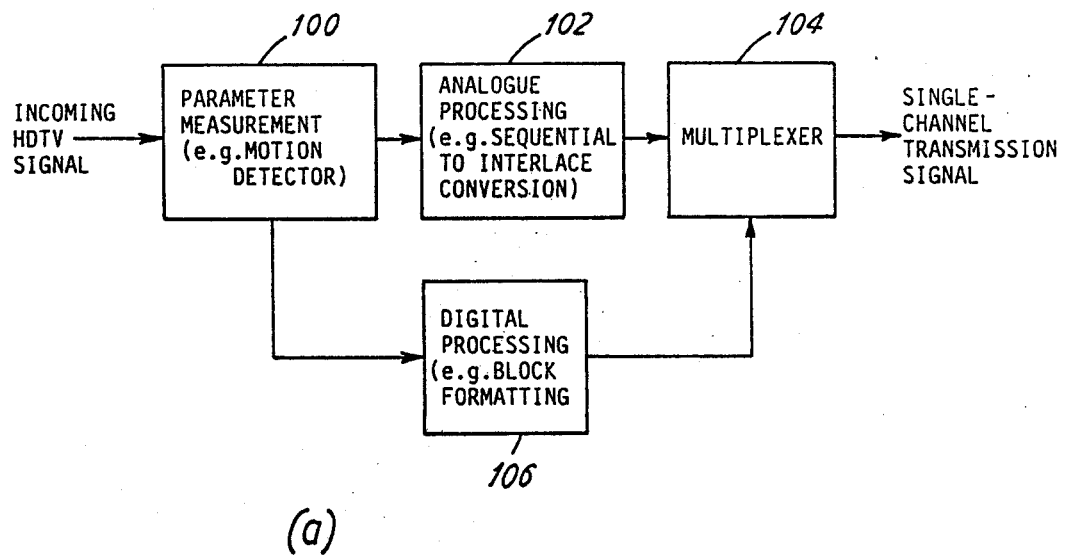
FIG. 3 is a block circuit diagram illustrating two ways of transmitting a digital information signal associated with an analogue video signal, (a) multiplexed onto the video signal and (b) in an accompanying channel.
Figure 3:
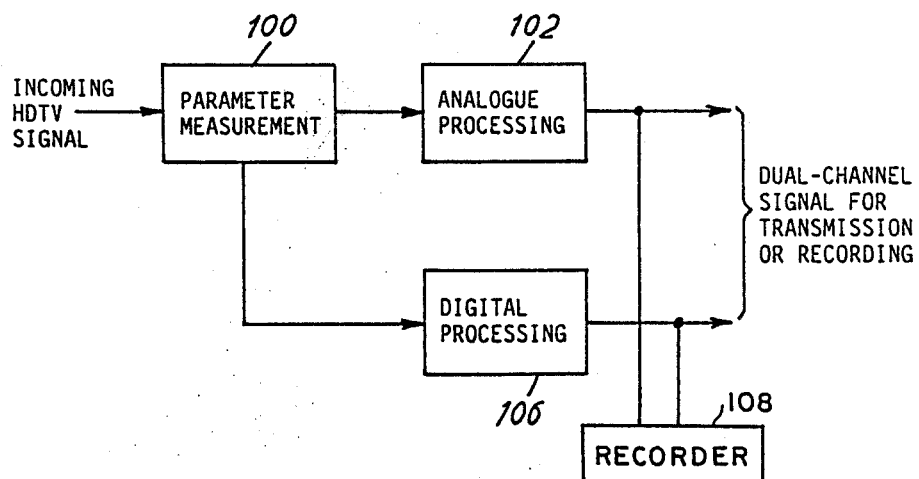

Turning now to FIG. 3, two ways in which the hybrid coding may be implemented are shown. The first method shown at (a) is that used in the system of FIGS. 1 and 2. The incoming HDTV signal is applied to a circuit 100 for measuring the parameter in the picture content which is being used to select the appropriate bandwidth compression system, in this case the circuit is effectively a movement detector. The HDTV signal is then subjected to essentially analogue processing in a processor 102, including for example sequential to interlace conversion, and applied to a multiplexer 104. In practice this processing can be implemented using digital techniques. The output of the parameter measurement circuit 100 is subjected to any necessary digital processing, such as block formatting to relate the parameter to the corresponding area of the displayed picture, and then applied to another input of the multiplexer 104 where it is combined with the analogue signal for transmission over a single channel. Any conventional method may be used such as time division or frequency division multiplex. The method shown at (a) is most useful for broadcasting purposes.

However, as shown in (b) in FIG. 3 the multiplexer 104 can be omitted and the digital data signal transmitted over a separate channel. This might be more appropriate in situations such as videotape recording. For example, the analogue signal can be a standard interlaced signal recorded in the normal way, and the data channel can be recorded on a convenient audio channel, or even on a separate tape but locked to the first tape by a suitable time code.

For simplicity in this specification reference is made to "transmitting" the signal but it will be appreciated that this term includes other forms of processing such as recording the signal as by using a recorder 108 shown in FIG. 3(b).

The information as to which parts of the incoming picture are moving and which stationary is transmitted in the digital part of the hybrid signal in order to inform the receiver decoder how to correctly decode the bandwidth-compressed HDTV signal. However, it can also be used at the receiver for expansion.

Similarly, if high-frequency static detail makes heavy bandwidth demands on the analogue channel, the nature and location of these features can be transmitted in the digital channel and used in the final reconstruction. Features associated with a sequential scan can be transmitted in the digital channel to assist the reconstruction of upconverted sequential display when the transmission has been interlaced to assist bandwidth conservation.

Figure 4:
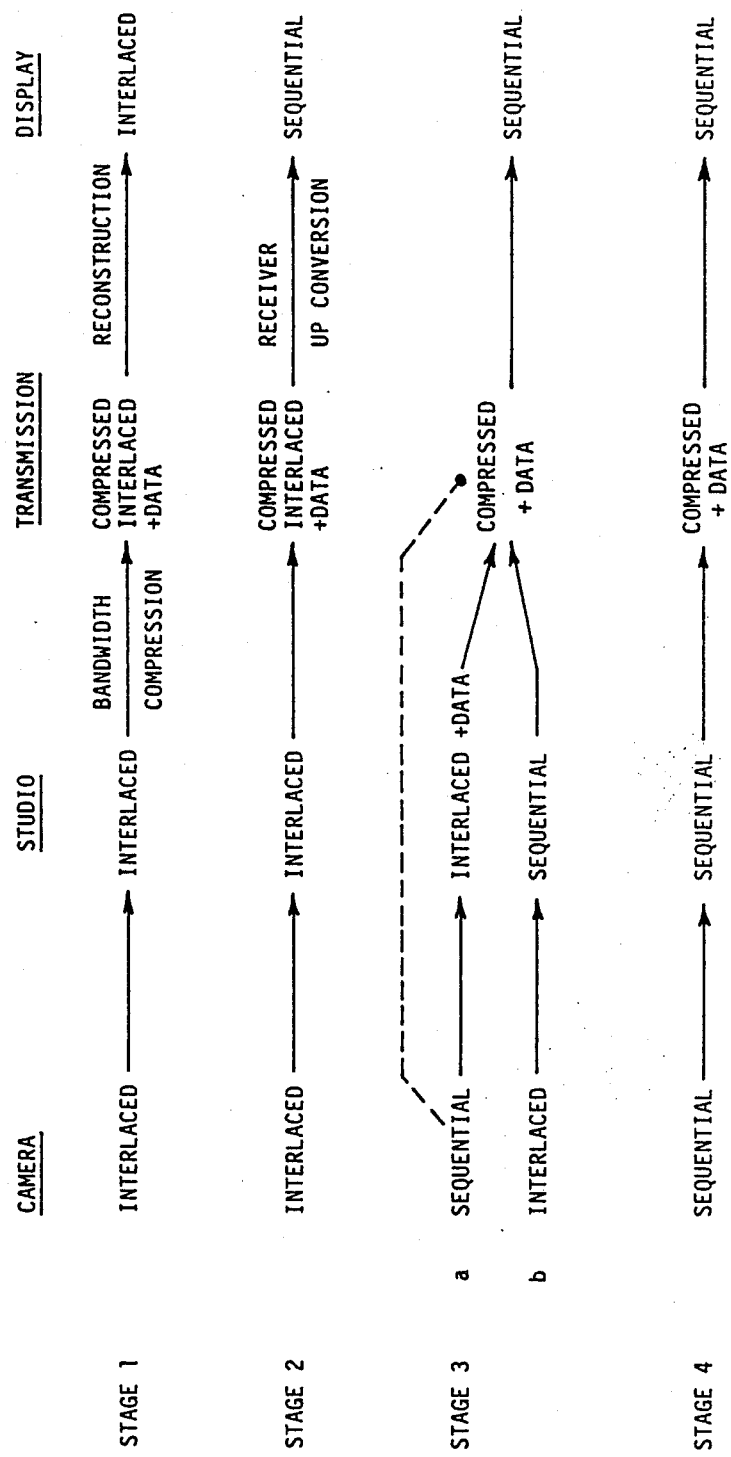
FIG. 4 illustrates a possible upgrade path from a system embodying the invention using interlaced signals throughout from source to receiver.

The hybrid method described is also helpful in an evolutionary approach where the television system is upgraded as technology improves. Thus a logical progression of HDTV standards can be foreseen as shown in FIG. 4. Initially the source, transmission and display are all based on the same, interlaced standard (shown in line 1 of the figure. However, a little advance planning of the data channel would easily clear the way for the progressive introduction of more developed systems capable of higher resolution. At the same time, a second receiver, possibly with a smaller display, might not require the full resolution and could use the data channel to control a much simplified decoder which treats all the incoming signal as if it were moving.

As receiver technology advances, the situation may proceed to that shown in line 2; the receiver upconverts the signal to a sequential scan for display. If the transmission field rate is lower than 60Hz, it may also be necessary to increase this at the receiver in order to eliminate large-area flicker.

A further progression would be to allow parts of the studio signal processing chain to operate in a sequentially-scanned manner. Two alternatives are shown in lines 3*a* and 3*b* of the figure; either the camera is scanned sequentially, and the result converted to interlaced, or else a sequentially-scanned signal is generated from an interlaced source, probably using sophisticated motion estimation methods. In the former case, it is a relatively simple addition to allow an auxiliary data signal to be carried along with the interlaced video; this data signal will ease any subsequent conversion back to sequentially-scanned form and is the same in concept as the movement data carried by the transmission system. Indeed the bandwidth compression coder for the transmission path may well work better if allowed to use the data generated in the sequential-to-interlace conversion system; this flow of information is indicated by the dotted line in FIG. 4.

The final progression would be to use sequential throughout the studio - this is shown in the bottom line of the figure. In this case the information in the digital channel would be primarily concerned with reducing the bandwidth demands associated with the large amplitude dynamic information and high frequency static information of the original signal.

Various methods of display up-conversion are described in BBC Research Department Report No. 1983/8, "The Improved Display of 625-line Television Pictures" by A. Roberts. Whilst some of the relevant information to assist receiver upconversion can be derived from the analogue signal itself, the hybrid transmission allows essential additional information to be transmitted which could not be extracted from the analogue signal. Furthermore, there are some overall system advantages not associated with bandwidth compression which hybrid transmission provides. For example, the responsibility for the detection of movement is transferred to the signal coder. Because fewer of these would be required, the cost and complexity can be substantially higher. Thus more sophisticated movement detectors can be used, having a proportionately better performance.

The system as outlined above and illustrated in FIGS. 1 and 2 suffers from two potential disadvantages. The first of these is that, even when the picture is perfectly stationary, the signal is still subjected to the loss associated with the stationary-path diagonal filter. This can be overcome by making this filter also motion-adaptive so that, for very slow movement indeed, the diagonal filtering is removed completely: the picture will then build up over eight fields. The additional movement information can be added to the auxiliary data channel; it may be necessary to increase the compression ratio of the sub-sampled video slightly, or increase the size of the individual blocks into which the picture is divided in the motion detector, in order to make the additional bandwidth available. There is no need, though, to use the same block size for the additional motion signal as for the main motion signal. For example, the main motion signal can use blocks of 4 field lines by 8 pixels while the additional motion signal for slow speeds uses blocks of 8 lines and 16 pixels. This reduces the extra capacity that must be accommodated by a factor of four (to 0.42Mbit/sec).

The second disadvantage of the system outlined above is potentially more serious. It has been widely assumed in the past that the eye cannot make use of high spatial frequencies if they are moving, and this is indeed true for a fixed gazing point. For normal television pictures, however, the eye will generally attempt to follow moving areas of interest either by continuous motion for low speeds or by "saccadic" motion for high speeds. That is, if the eye is following a moving object, then the image on the retina is stationary and any loss of fine detail can become noticeable. The eye's spatial detail requirements in moving areas may well be reduced but certainly not, in the case of uniform well correlated motion, by the large factors assumed in most of the literature.

This problem can also be overcome at the expense of requiring an increased capacity in the auxiliary data channel. In this instance the amount of movement is estimated to produce a motion vector indicating the amount of motion any given area of the picture has suffered. A method is described in a paper presented at the 128th SMPTE Technical Conference, Oct. 24-29, 1986 N.Y., Preprint No. 128-49, "HDTV Bandwidth Reduction by Adaptive Subsampling and Motion Compensation DATV Techniques", and in our British Patent Application 86 17320. In this method two successive pictures are correlated as a function of displacement to determine one or more peak correlation values corresponding to respective motion vectors. The picture is then analysed in blocks of a few pixels square to determine which of the possible vectors is most appropriate to that block. Other methods of estimating motion vectors are known from a paper presented to the 14th International Television Symposium, Montreux, June 1985 by SUGIMOTO, FUJIO and NINOMIYA, "Second-generation HDTV standards converter".

Such techniques can be used to measure the motion vectors of, say, the two most important moving items in the scene, one of which could be the background during camera pans, for example. These vectors can be sent to the receiver once every field, requiring only a very small additional data capacity. If each picture block is then coded with two bits rather than one, four different conditions can be indicated—viz "stationary", "moving with vector 1", "moving with vector 2" and "moving, but not with vector 1 or 2". The address fed to the field stores in the transmitter coder and receiver decoder is then adjusted to allow those areas detected as moving with vector velocities 1 or 2 to be coded using the stationary algorithm and thus reproduced with the full static resolution of which the system is capable. Strictly speaking this approach only works when the motion velocities are integer values of picture elements per field. However, interpolation can be used to cope with motion velocities having a fractional pixel per field component. However, removing the major component of the scene motion aids the choice of diagonal filtering parameters and, in any case, the subjective effects of sub-pixel movement errors may be sufficiently benign to make this interpolation unnecessary.

The way the system uses the motion vectors is that it displaces the reference frame of the high spatial detail pre-filter 16 in such a way that moving areas appear to be stationary. They can then be transmitted in their correct spatial position and with full spatial detail.

The decoder is told the values of motion vectors for the following field during vertical blanking, and is told which areas belong to which motion vector continuously via the control data channel. It then applies complementary displacements to its stationary interpolator's reference frame to reconstruct highly detailed moving areas. Displacing pre-filter and interpolator reference frames rather than the bandwidth compressed signal permits a receiver without motion compensation to use the motion compensated signal, thereby preserving compatibility. In such a receiver, the motion compensated areas are decoded using a modified motion mode, thus allowing them to be reproduced in the correct position but with the previously noted poorer spatial resolution.

The block sizes used for determining whether motion exists and what type of motion it is do not, in fact, have to be the same.

It should be noted that both of these enhancements can be achieved in a compatible way, provided sufficient data capacity has been allocated at the start of any broadcasting service. It is clear that receivers not equipped to deal with the additional slow movement information will merely continue to diagonally filter all stationary pictures. In a similar way, receivers not equipped to use the motion vector information will simply decode all areas of the picture not identified as "stationary" as if they were moving but with no measurable vector: in other words "moving with vector 1" and "moving with vector 2" will simply be interpreted as "moving". This principle could, of course, be extended to include larger numbers of motion vectors in order to transmit scenes containing complex motion.

Although the arguments presented so far have been directed towards the transmission of high definition images, the digital assistance principle can be used to improve the performance of systems having a lower basic definition such as MAC or current PAL and NTSC. A simple motion signal, sent via a digital assistance channel, could make display up-conversion to a higher line number, or to a sequential scan, more effective by helping to differentiate between motion and high frequency vertical detail. The resulting potential increase in vertical detail could be complemented in the horizontal direction by using bandwidth reduction techniques, and here again a reliable motion signal would be valuable.

For example, with C-MAC, motion vectors with moving/stationary indication can be transmitted on a block by block basis. With teletext-type transmissions in PAL, motion vector information may be included to assist receiver motion detectors used for improved PAL decoding, or in up-conversion, for example.

The further addition of motion vector information could, with sufficient processing power, permit the interpolation of intermediate fields with correctly positioned moving objects. This would largely remove artefacts such as the combing of moving horizontal detail caused by simple, non-motion corrected, temporal interpolation between adjacent moving fields.

A reliable motion signal could also simplify the implementation of video noise reduction at the receiver by avoiding the need for the complex noise measurement circuits required for a remote motion detector. This could be a very useful facility for a satellite receiving system where the size of receiving dish is limited for other reasons.

We claim:

1. A system for transmission of analogue video signals comprising, at a transmitter:
   an analogue video signal source;
   sampling means for sampling the analogue video signal generated by the source;
   bandwidth compression means for compressing the bandwidth of the video signal generated by the source selectively by two or more different methods in response to a control signal, and including sub-sampling means for sub-sampling the sampled analogue video signal generated by the source;
   means for converting the sub-sampled, bandwidth compressed video signal into analogue form;
   means for transmitting the bandwidth-compressed video signal in analogue form;
   control signal generating means responsive to the picture content of the video signal generated by the source to generate the control signal for successive picture areas to command the bandwidth compressing means to select a required one of the bandwidth compression methods for successive picture areas;
   and at a receiver;
   means for receiving the transmitted bandwidth-compressed video signal;
   means for reconstituting a signal for display from the bandwidth-reduced transmitted video signal selectively by two or more different methods in dependence upon picture content;
   and means for displaying the reconstituted signal; further including:
   means at the transmitter for transmitting in association with the analogue video signal a digital signal comprising the said control signal; and
   means at the receiver responsive to the transmitted digital signal to extract the control signal and command the reconstituting means to select the required one of the reconstituting methods for successive picture areas to reconstitute the signal for display.

2. A system according to claim 1, in which the bandwidth compression means comprises a vertical-temporal filter and a spatial filter both coupled to receive a signal from the source.

3. A system according to claim 2, including a diagonal filter between the source and the vertical-temporal and spatial filters.

4. A system according to claim 3, in which the diagonal filter is adaptively dependent upon movement, and the digital signal transmitted to the receiver contains information relating to the mode of operation of the diagonal filter.

5. A system according to claim 1, in which there are at least 1000 such areas in each picture.

6. A system according to claim 1, in which each such area comprises at least 10 pixels.

7. A system according to claim 1, in which the areas are diamond shaped.

8. A system according to claim 1, including means for multiplexing the said digital transmitted signal with the analogue video transmitted signal.

9. A system according to claim 1, in which the transmission comprises a recording operation.

10. A system according to claim 9, including means for transmitting and recording the digital signal along with the associated analogue video signal.

11. A system according to claim 1, including means for determining one or more motion vectors comprised in the picture and for transmitting in the digital transmitted signal the values of the motion vectors for that picture.

12. A system according to claim 11, in which two or more labelled motion vectors can be transmitted, and the control signal is determined for successive picture areas as indicating that the picture is stationary, is moving with a defined one of the labelled motion vectors, or is moving in an undefined manner.

13. A system according to claim 11, in which when motion is detected approximating to one of the motion vectors, the bandwidth compression means takes account of motion in the amount of the motion vector before determining whether temporal or spatial filtering shall be used.

14. A system according to claim 1, in which the control signal generating means comprises reconstituting means like that at the receiver, and comparator means for comparing the operation of the reconstituting means in each of its methods of operation to determine the best method.

15. A system according to claim 1, in which the receiver includes up-conversion means for converting from an interlaced transmitted video signal to a sequential display standard, the up-conversion means being responsive to the digital transmitted signal.

16. A video signal transmitter, comprising:
an analogue video signal source;
sampling means for sampling the analogue video signal generated by the source;
bandwidth compression means for compressing the bandwidth of the video signal generated by the source selectively by two or more different methods in response to a control signal, and including sub-sampling means for sub-sampling the sampled analogue video signal generated by the source;
means for transmitting the bandwidth compressed video signal in analogue form;
control signal generating means responsive to the picture content of the video signal generated by the source to generate the control signal for successive picture areas to command the bandwidth compression means to select a required one of the bandwidth compression methods for successive picture areas; and
means for transmitting a digital signal comprising said control signal in association with the analogue video signal.

17. A video signal receiver comprising:
means for receiving an analog bandwidth-compressed video signal in which bandwidth compression of a sampled analog video signal is achieved selectively by two or more different methods which includes subsampling of the sampled analog video signal;
means for reconstituting a signal for display from the received signal selectively by two or more different methods in dependence upon picture content; and
means for displaying the reconstituted signal; including:
means for receiving a digital signal transmitted in association with the analog video signal to extract a control signal therefrom and command the reconstituting means to select the required one of the reconstituting methods for successive picture areas to reconstitute the signal for display.

* * * * *